Figure 1:
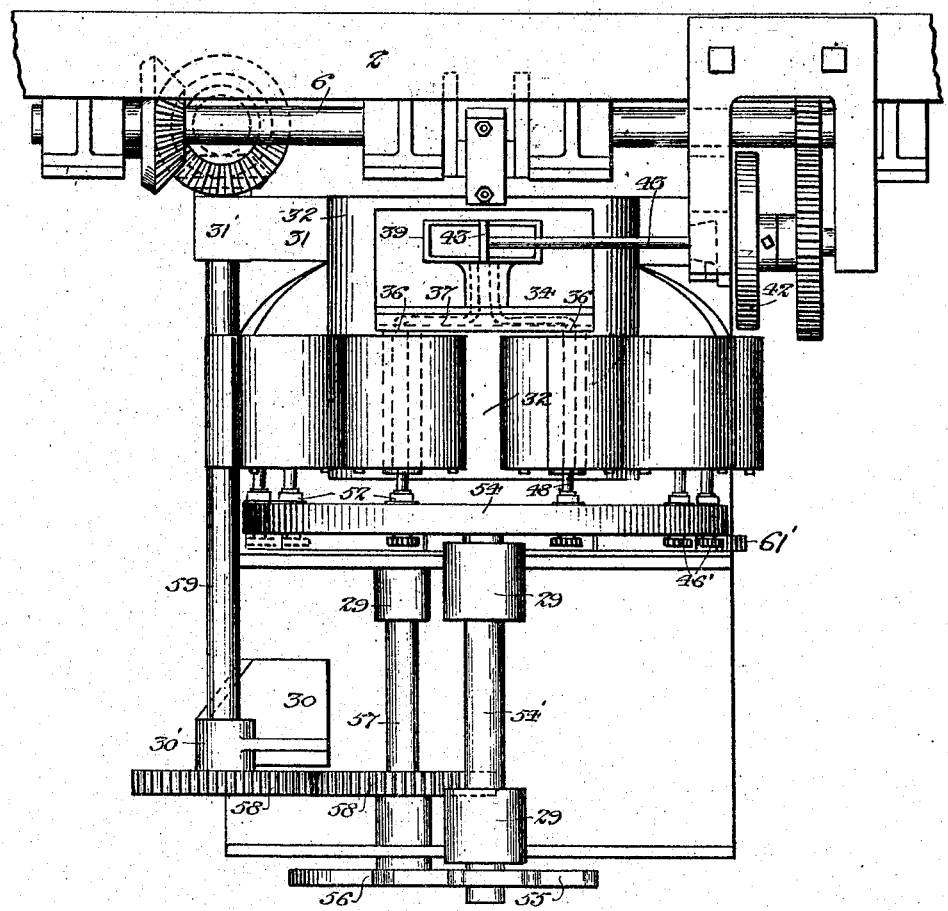

V. ODQUIST.
CAN MAKING MACHINE.
APPLICATION FILED MAY 28, 1904.

900,118.

Patented Oct. 6, 1908.

6 SHEETS—SHEET 1.

Witnesses,

Inventor,
Victor Odquist

V. ODQUIST.
CAN MAKING MACHINE.
APPLICATION FILED MAY 28, 1904.

900,118.

Patented Oct. 6, 1908.
6 SHEETS—SHEET 2.

Witnesses

Inventor,
Victor Odquist

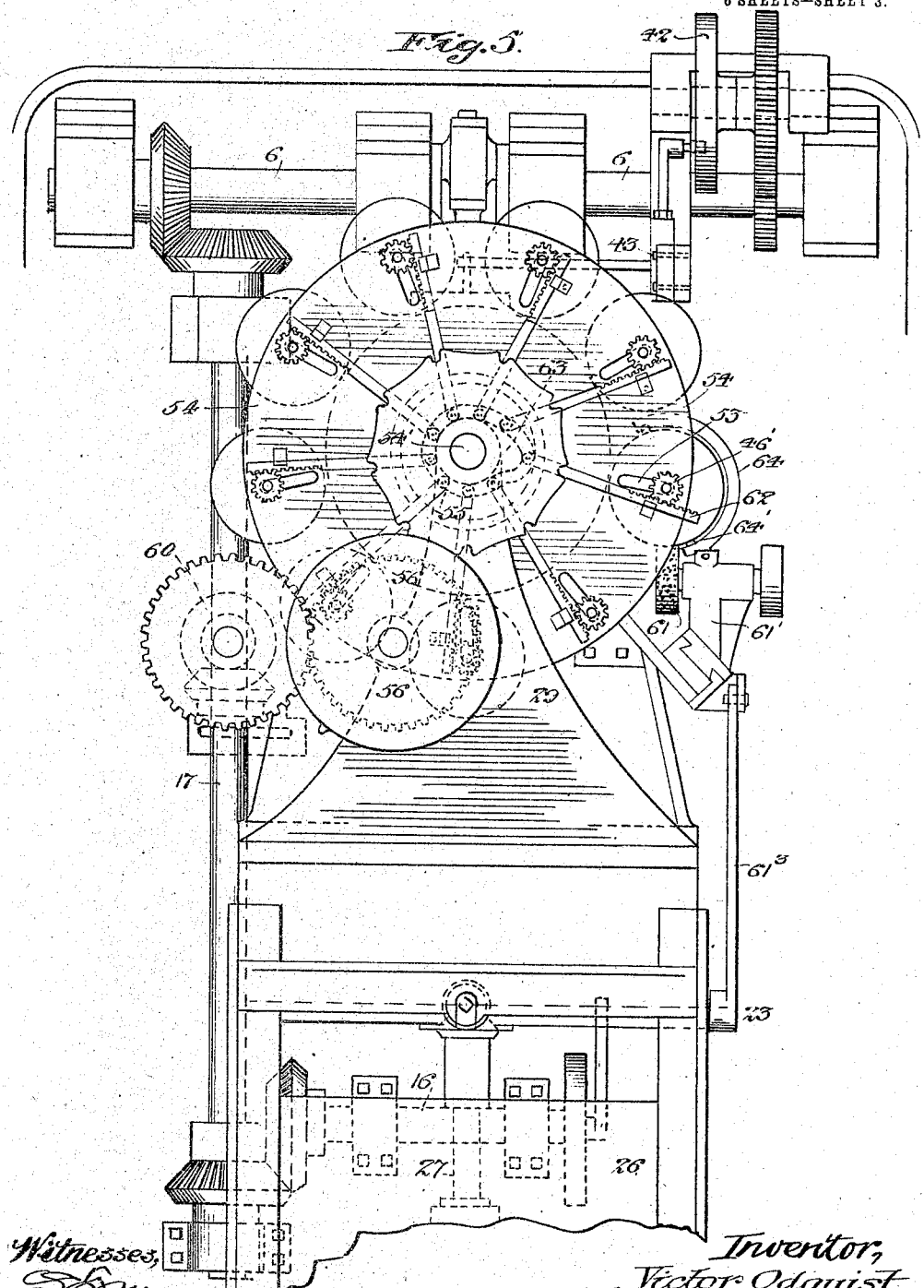

V. ODQUIST.
CAN MAKING MACHINE.
APPLICATION FILED MAY 28, 1904.

900,118.

Patented Oct. 6, 1908.
6 SHEETS—SHEET 4.

Witnesses,

Inventor,
Victor Odquist
By
Attys

V. ODQUIST.
CAN MAKING MACHINE.
APPLICATION FILED MAY 28, 1904.
900,118.
Patented Oct. 6, 1908.
6 SHEETS—SHEET 5.
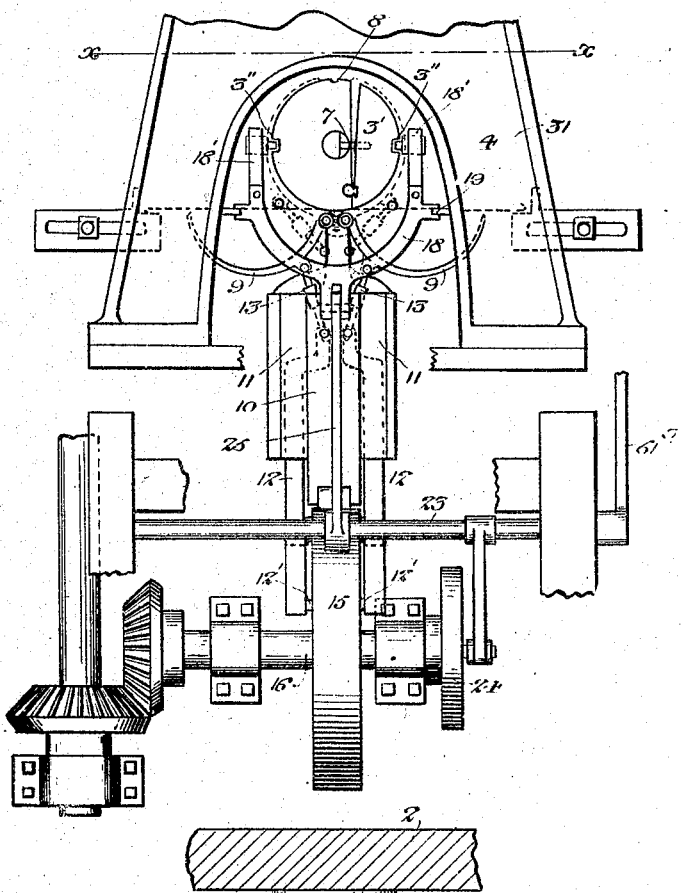
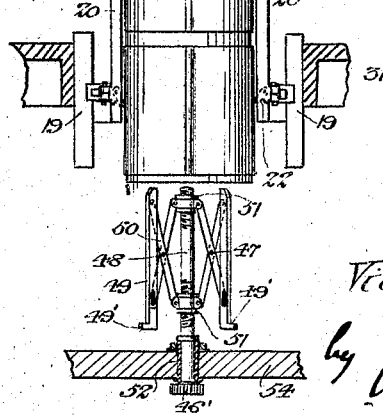
Witnesses,
Inventor,
Victor Odquist

V. ODQUIST.
CAN MAKING MACHINE.
APPLICATION FILED MAY 28, 1904.

900,118.

Patented Oct. 6, 1908.

6 SHEETS—SHEET 6.

Witnesses,

Inventor,
Victor Odquist
By

UNITED STATES PATENT OFFICE.

VICTOR ODQUIST, OF CHICAGO, ILLINOIS, ASSIGNOR, BY MESNE ASSIGNMENTS, TO TORRIS WOLD & COMPANY, OF CHICAGO, ILLINOIS, A CORPORATION OF ILLINOIS.

CAN-MAKING MACHINE.

No. 900,118.     Specification of Letters Patent.     Patented Oct. 6, 1908.

Application filed May 28, 1904. Serial No. 210,251.

*To all whom it may concern:*

Be it known that I, VICTOR ODQUIST, a resident of Chicago, Cook county, Illinois, have invented certain new and useful Improvements in Can-Making Machines, of which the following is a specification.

My invention relates to can making machinery and has special reference to machines for forming, side seaming and soldering can bodies.

Further, and particularly, the invention refers to a machine for automatically side seaming and soldering tin cans and which performs its functions without manual intervention, beyond the feeding of the blanks to the machine.

The object of my invention is to provide a side seaming and soldering machine of large capacity; which shall be capable of making can bodies of many different sizes; and which shall occupy less floor space, cost less and be more reliable than the present machines of the same class.

A particular object of the invention is to do away with the elongated conveyer and extension horn that are typical of present machines.

Another object, which I have in view, is to improve the mechanism employed for removing the can body from the former horn, and still another object is to improve the means for holding, heating and soldering the cans and sweating the solder into the seams thereof.

A further object of the invention is to improve the solder supply mechanism.

Other objects of the invention will appear hereinafter.

My invention consists in a can making machine, comprising body forming mechanism, in combination with body moving means, a multiple conveyer and a heating, soldering and sweating device, about which the can bodies are carried by the rotation of said multiple conveyer;—and further, my invention consists in a novel mechanism for fluxing the can body seams and, for maintaining solder in molten condition and elevating it to momentarily flood the seam of a can; and, my invention also consists in novel mechanism for wiping the can seams and removing the can bodies from the carrier; and further resides in various details of construction and in combinations of parts, all as hereinafter described and particularly pointed out in the claims.

The invention will be more readily understood by reference to the accompanying drawings, forming a part of this specification, and in which:—

Figure 2:
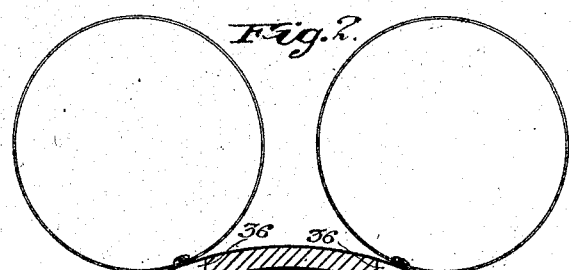
Figures 3, 4:
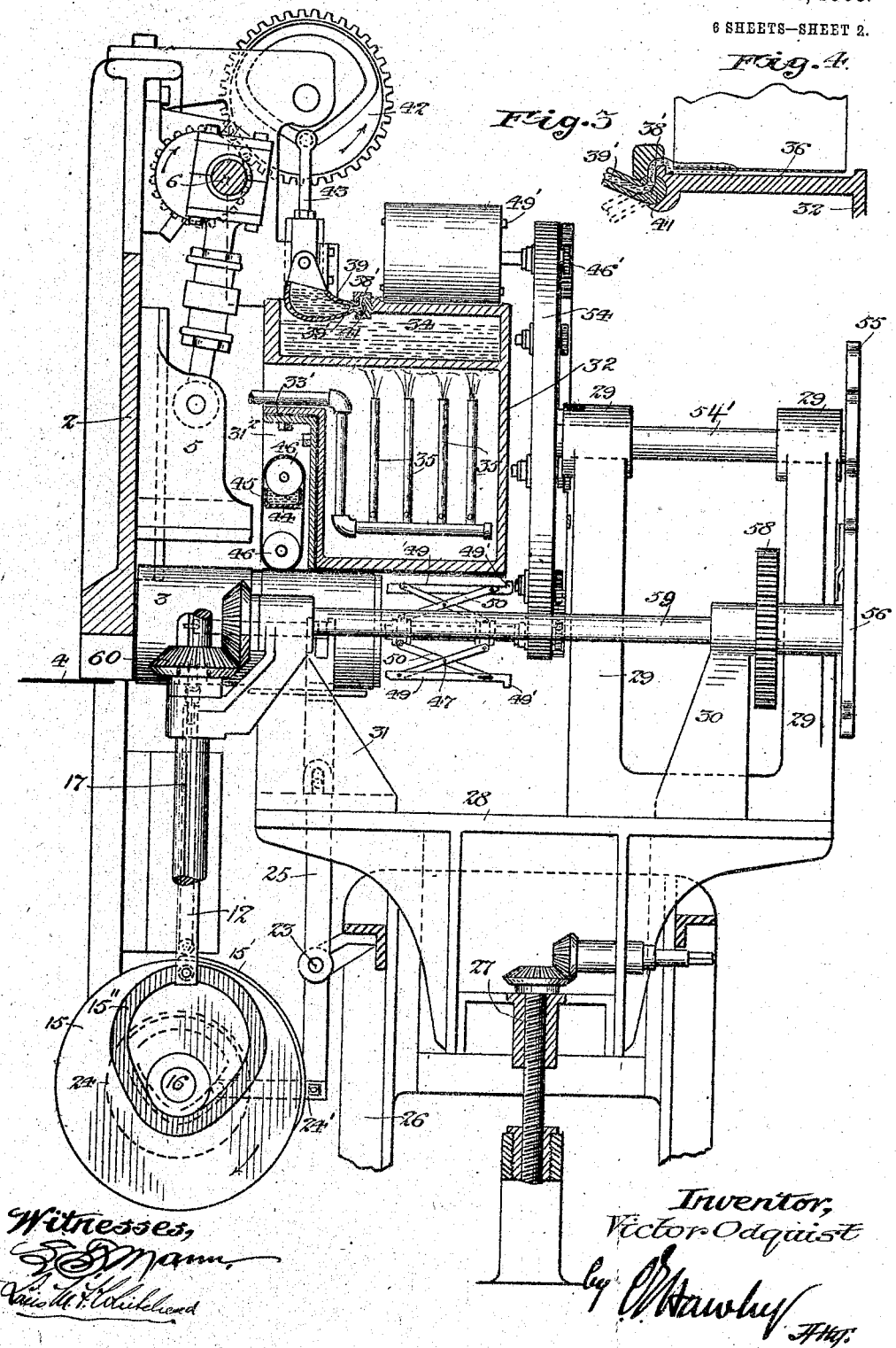
Figures 6, 7:
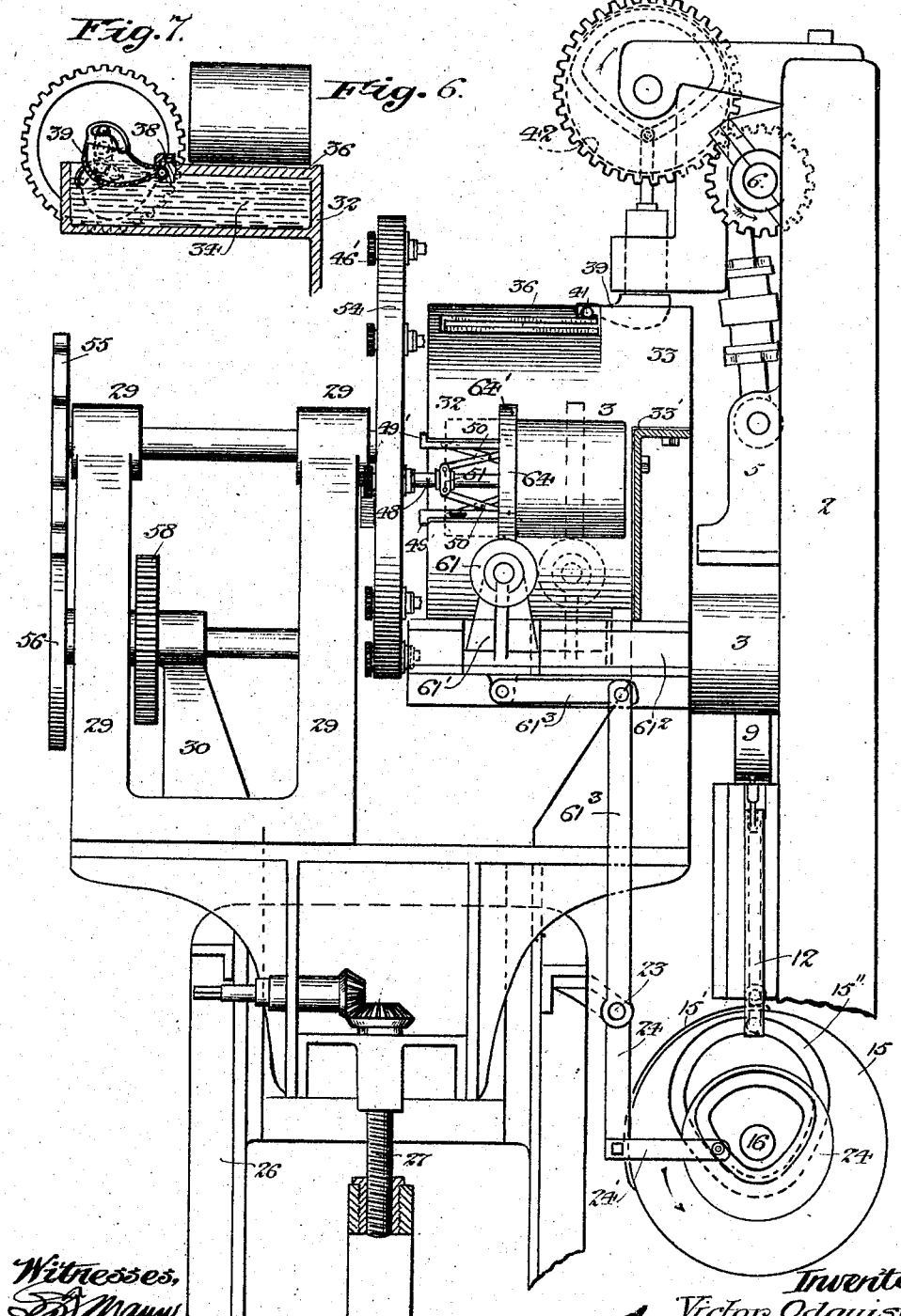
Figure 10:
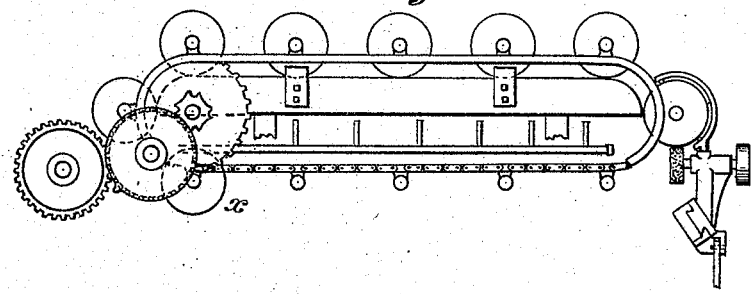
Figure 11:
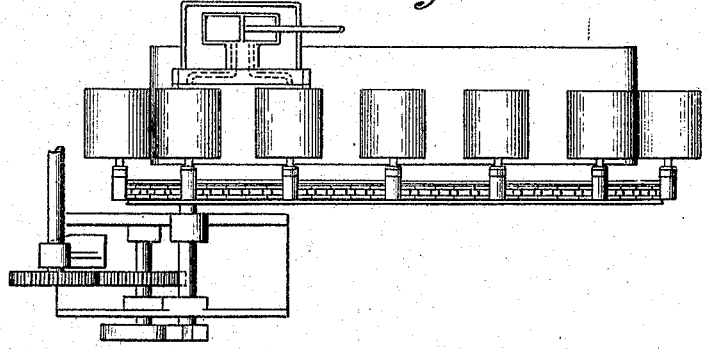
Figure 12:
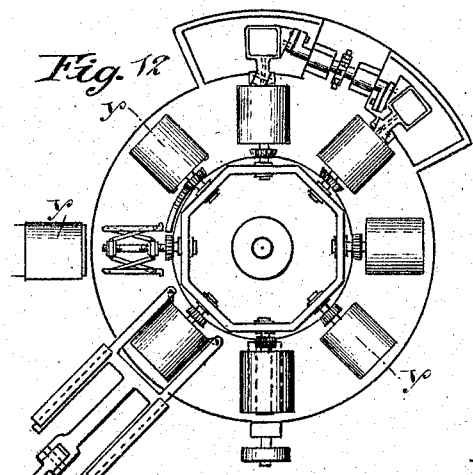
Figure 13:
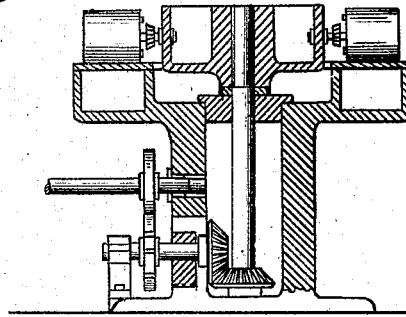

Figure 1, is a plan view of a can making machine embodying my invention; Fig. 2, is a detail view of the sweating drum, showing two cans above the solder grooves or ducts therein; Fig. 3, is a vertical, longitudinal section of the machine; Fig. 4, is an enlarged detail of the joint between the stationary and movable members of the solder elevating device, showing the manner of flooding the seam of a can; Fig. 5, is a rear elevation of the machine; Fig. 6, is a side elevation, partly in section, showing the can wiping and discharge mechanisms; Fig. 7, illustrates a modification of the seam soldering mechanism; Fig. 8, is a detail view of the former horn and associated parts; Fig. 9, is a plan view of the take-off mechanism used in connection with the former horn, as viewed from the line $x$—$x$ of Fig. 8; Fig. 10, illustrates a modification of the multiple carrier and the heating and sweating device; Fig. 11, is a plan view thereof; Fig. 12, illustrates a further modification of my invention; and Fig. 13, is a sectional view of the line $y$—$y$ of Fig. 12.

In illustrating my machine, I have deemed it proper to omit the blank feeding and edging mechanism which is always part of a can forming machine. That particular part of the machine may be of any desired and well known construction, adapted to receive and edge the blanks and feed them to the former horn.

The gist of my invention, to-wit: the means for forming a can body upon a suitable horn, for removing the can body therefrom, and for performing succeeding operations upon the can during movement that is transverse to the former horn, is capable of embodiment in various ways and structures, several of which will be described and indicated herein. I prefer that the machine shall comprise blank feeding and edging mechanism (not shown), in combination with a former for interlocking and seaming the edges of the blank to form a can body, and a continuous or cylindrical seam heating, soldering and sweating device immediately adjacent to the horn and about which the can bodies are moved in series, one following the other. In the principal figures of the drawings I have shown a can body forming and side seam soldering machine, wherein the can bodies are delivered from the former horn to a rotary multiple can holder, which operates in conjunction with a hot drum or cylinder that is internal to said multiple holder and contains a solder pot and solder elevating device, in its upper part; whereby each can body when taken from the former horn has its seam pressed against a hot drum and is rotated about the drum, the can seam being soldered and sweated before the can body is permitted to leave the holder or the drum.

The machine possesses other novel features which will appear hereinafter.

Referring now to Figs. 1 to 9, 2 represents the main frame or arch plate of the machine. The blank feeding and edge forming mechanism, above referred to as not shown, is arranged upon the back of this plate. The edged blank approaches the former horn, 3, in the plane of the bottom thereof, as represented by the lines, 4, in Fig. 3. The former horn, 3, is attached to the front of the arch-plate, 2, and is preferably as long as two can bodies placed end to end, the forward part of the horn being a body holding extension, or false horn or guide. 5, represents the bumper for closing the can seam. This is arranged above the horn and is operated from the crank shaft, 6. The horn and the forming or folding wings which I use, operate in the well known manner, being like unto those used in older machines, but differing in details of construction and operation. I prefer an expanding horn as shown in Fig. 8, 3' being the movable section of the horn and, 7, being the expanding pin of the horn. 8 is a groove in the top of the horn to receive the can seam when the latter is pressed by the bumper, 5. The folding or forming wings, 9, 9, are pivoted upon the upper end of the bar, 10, movable in guides, 11, and said wings are operated by the movement of said bar, 10, and the bars, 12, 12, which latter are connected with the wings by the adjustable links, 13. The reciprocating bars, 10, 12, 12, are all operated from a single cam wheel, 15, that is arranged on a shaft, 16, having bearings on the plate, 2, beneath the horn, 3. The shaft, 16, is connected to shaft, 6, by shaft, 17, and bevel gears, and is therefore driven in time with the crank shaft, 6. The face of the cam wheel, 15, is provided with a cam rise, 15', for vertically operating the holder bar, 10. The vertical movement of the bar, 10, need not be great; only enough to permit the entrance of a can blank between it and the bottom of the former horn. The bars, 12, which are connected to the wings, 9, require a greater movement and each has a pin, 12', that extends into a cam groove, 15'' in the adjacent side of the cam wheel, 15.

The operation of this portion of my machine is as follows: At the moment when a previously edged blank is fed forward beneath the former horn, the folding wings are in the position shown in Fig. 8, and the bar, 10, is in its lowest position, to admit the blank. At the same moment, the bumper, 5, is being raised. As soon as the blank is positioned, by the edging and feeding mechanism, the bar, 10, is raised by the action of the rise or lift on cam 15, to clamp the blank against the bottom of the horn. This movement is immediately followed by the lifting of the cam actuated bars, 12, 12, and hence the wings, 9—9, which latter fold the blank snugly around the horn and cause the edges of the blank to overlap. The horn is then expanded to interlock the hooked edges of the blank, and the bumper, 5, immediately descends and closes or swages the seam. At the moment the bumper reaches its lowest position, the bars, 10 and 12, are drawn down by the action of the cam wheel, 15, to prepare the folding wings to receive another blank. The bumper is next lifted to free the can body and the horn is collapsed, after which, the take-off mechanism comes into operation.

The take-off mechanism comprises a fork, 18, that stands upright and is held by the guides, 19, so that it may move toward and from the arch plate, 2. The upper ends of the fork have adjustable extensions, 18', in which are arranged the bars, 20—20, which lie alongside the horn, 3. Each bar contains a spring hook, 21, and a spring dog, 22, separated by a distance approximating the length of the can body. When the fork is moved back, the hooks, 21, engage the rear end of the can body, while the dogs, 22, engage the rear end of the previously formed body still remaining upon the extension or false part of the horn. The horn has grooves, 3'' in its sides to admit the dogs or hooks, 21 and 22, belonging to the fork. The fork is actuated in time with the other portions of the mechanism, the operating connections comprising a rocking shaft, 23, operated from a side cam, 24, and joined to the fork by the arm or lever, 25. The cam connection, 24', is shown in Figs. 3, 6 and 8. Said wheel is fixed on the shaft, 16, and the rocking shaft, 23, is arranged in bearings on the secondary frame or standard, 26, in front of the main arch plate, 2, and is secured to the same base.

The standard, 26, carries a vertically adjustable frame upon which the soldering mechanism is arranged. The adjustable frame has its lower end slidably held in the standard, 26, and may be raised and lowered by means of the jack screw, 27. The plate, 28, of the adjustable frame carries the standards, 29, 30 and 31, the latter having the form of an arch, as shown in Fig. 8, and bearing or supporting the soldering drum or cylinder before referred to. The main body of this part, 32, is cylindrical. It is, however, provided with a projection, 33, at its rear end to overhang the top of the arch, 31. Asbestos, 33', or the like is interposed between the parts and the drum is bolted upon the arch, 31, being carefully alined or made parallel with the former horn of the machine. The drum 32 is preferably a metal casting and is hollow. The upper part is cored out to form a solder pot or bath, 34, and the space beneath the bath is occupied by a number of gas burners, 35, the flames of which keep the whole drum hot, as well as keeping the solder in a molten state. The top surface of the drum is provided with one or more shallow grooves, 36, preferably closed at both ends. If two grooves are used they are joined by a transverse trough, 37, having small twyers, 38, for delivering solder to the ends of the solder grooves, 36. For conciseness I describe but one groove, it being clear that more such grooves may be used if so desired. The solder groove, 36, is not continuously flooded with solder; on the contrary the solder is supplied thereto intermittently and in small portions. Any suitable mechanism may be employed for this purpose without departing from the spirit of my invention, but I prefer the novel dipper-like device, 39, herein illustrated. This dipper or spoon is arranged first to descend into the body of molten solder and be filled with solder, and then rise and discharge a small quantity of solder into the solder groove, 36. The quantity which is thus supplied may be greater than required for a single can, and in such case the surplus will flow back into the solder pot, through the slot, 40, that parallels the solder groove, in the top of the drum. It will be noted that the solder is accurately measured by means of the ported swivel or joint, 41, of the dipper. (See Figs. 3 and 4). The end of the dipper is journaled in a close bearing and when the dipper is raised, the duct, 39', in the neck thereof, communicates with the duct or twyers 38, of the solder groove, 36. I prefer this construction because it not only measures the supply of solder but also times the discharge of the solder into the solder groove, thereby allowing the said groove to be filled or flooded at the precise moment when a can body arrives in position above the groove. The result of the sudden flooding is to send or forcibly drive the solder along the groove and also into the bottom of the can body. (See Fig. 4). The can body, at this moment, is stationary and it will be seen that the solder flows, not only to, but through, the body, along both the outer and inner sides of the seam. The flooding of the seam in this way insures the filling of the seam, and the positive expulsion and exclusion of air therefrom. The dipper should not be worked rapidly in the molten solder, and for this reason I may use two or more of the dippers not shown, all delivering into a single groove or set of grooves, to supply solder for successive cans. The dippers may be operated in any suitable manner, as from an overhanging cam, 42, driven from the shaft, 6, and suitably connected to the dippers by a rod, or rods, 43. The dipper movement is timed to suit the arrival of successive cans at the groove or grooves, 36.

For fluxing the seams of the can bodies, which operation should occur previous to the heating and soldering operations, I use a small fluxing device, comprising the flux receptacle, 44, and a short belt, 45, of felt or the like. This belt passes over small pulleys, 46, 46, one substantially in contact with the top of the can on the former horn, and the other dipping into the flux receptacle, 44. The whole device is preferably arranged in a recess, $31^2$, in the rear side of the standard, 31, and the lower end of the belt runs and wipes upon the seam of each can body, at the time it is taken off the forming portion on the horn and shifted to the false part or extension of said horn; thus each can is fluxed before it leaves the horn.

It will be understood that the movement of the can body, here referred to, is accomplished by the pawls, or dogs, 21—22, of the take-off device, described above, and which are also adapted to push the can body off the false part of the horn on to a receiver, 47, upon the multiple can holder, that stands ready at the end of the horn, and which comprises a wheel, 54, and a number of said receivers, 47.

Various horns may be used in my machine, for making cans of different diameters; and the adjustable frame of the machine is raised or lowered with each change of horn, to adjust the bottom of the drum, 32, close to the top of the former horn. As the machine is adjustable in these respects, it follows that the can holder should also be adjustable and my invention includes such a holder. As shown in Figs. 3, 6, and 9, the receiver or holder comprises a central stem, 48, and a plurality of parallel bars, 49, connected to the stem by the crossed links, 50, and the adjustable nuts, 51. The nuts may be either slidably secured to the stem, 48, or may be threaded thereon. By adjusting one or both thereof on the stem the parallel bars may be distended or retracted to fit can bodies of different sizes. The bars, 49, are provided with stop lugs, 49', at their ends, to prevent the over-running of the can body. A large number of these holders are arranged around the soldering drum, their stems, 48, being arranged in clamping sleeves, 52, secured in slots, 53, in the carrier wheel, 54. It will be obvious that the stems, 48, must be adjusted in these slots, 53, according to the size of can that is to be made and they are always adjusted so that the side of each can thus held will contact with the surface of the heating and soldering drum, 32. The cans received by the multiple holder are carried around the drum in succession or series, and it should be observed that as the seam of each can is uppermost at the time that the body is completed on the former horn, it will, when the body is ejected from the horn, be placed on the holder with the seam against the bottom of the drum. The relation of the seam to the drum is not changed during the movement of the can body from the bottom to the top of the drum and the seam will be thoroughly heated by contact with the drum during its travel thereon. A step-by-step movement is imparted to the multiple carrier or holder and the moment of stoppage is utilized for the placing of the can body upon the lowest holder, also for the soldering of the seams of one or two of the can bodies at the top of the drum, and also, for the discharge or ejection of a finished body from a last position at the side of the drum. The intermittent or step-by-step movement of the multiple carrier is obtained with a "Geneva movement," comprising the wheels, 55 and 56 (see Fig. 5). The wheels, 54 and 55, are arranged on the shaft, 54', having journals in the standards, 29, 29. The wheel, 56, is fixed on a shaft 57, also having bearings in said standards, 29. The rotation of shaft, 57, and wheel, 56, is derived from the shaft, 16, the connection being constituted by the gears, 58, 58, the shaft, 59, and the beveled gears, 60. The shaft, 59, is held in bearings, 30' and 31' on the standards, 30 and 31, and to permit the vertical adjustment of the soldering drum and the multiple carrier, one bevel gear, of the pair, 60, is made to slide on a key or feather in the shaft, 17; said shaft serving to drive the connected parts, in any of their vertical positions.

When two solder grooves are used in the soldering drum there will be an uneven number of receivers or holders on the wheel, 54, and said grooves are positioned according to the spacing of, or distance between, said holders. Where a plurality of solder dippers are used to supply the solder grooves, each can may have its seam flooded twice, once at each groove, but as a rule I prefer to solder alternate cans, the two grooves caring for all.

When a can is taken upon a holder from the horn, it is carried to the upper part of the drum without rotation upon its axis, but after the same has been soldered I prefer to slightly rotate the holder in order to keep the seam at the bottom or lowest level, and furthermore, finally present the seam to a suitable wiper, 61, which I prefer to arrange and reciprocate at the side of the drum. In order to wipe the seam, it is necessary to remove it from the surface of the drum, and this movement possesses the added advantage of being a precaution against the running of the molten solder from the can seam before it solidifies. As before explained, each holder stem is arranged in a sleeve or bushing properly secured in the wheel, 54. This arrangement permits the rotation of the stem and each stem carries a small gear wheel, 46'. A small rack bar, 62, meshes with this, and the inner end of the bar is arranged in the cam groove surrounding the stationary cam, 63. This cam is of such form that the rotation of the wheel, 54, causes the rack bars to move outwardly on the descending side of said wheel, 54, thereby rotating each holder as it descends towards the wiper, 61. After each holder passes the position of the wiper, its rack bar returns or moves inward (see Fig. 5), thereby rotating and restoring the holder. The wiper comprises the felt wheel, 61, arranged on a shaft, mounted in the slidable bearing, 61'. The shaft is driven by a belt, extending from any convenient point. $61^2$ represents the guide for the slidable bearing, 61'. The wiper is reciprocated by the link and lever connection $61^3$, extending from the rocking shaft, 23 (see Figs. 5 and 6), and the wiping of a can seam is done by the forward stroke of the rotary wiper. I employ the back or return stroke of the device to eject or strip the can body from the holder. For this purpose, I provide the curved arm, 64, on the bearing, 61', and equip it with spring dogs, 64', which, on the forward stroke of the wiping device, pass over, along the body and snap down at the forward end thereof. On the return of the wiper these dogs engage the can body and drive it off the holder, 47. At this point the completed can body may pass into a suitable chute or conveyer, arranged beside the machine.

It is not my purpose to confine my invention to the specific structures illustrated in Figs. 1 to 9, inclusive, and numerous modifications, which may be made without departing from the invention, will readily suggest themselves to one skilled in the art. Thus in Figs. 10 and 11, the several essential features in the invention will be recognized as being embodied in a machine wherein an elongated hot table and a long conveyer take the place of the cylindrical drum and the carrier wheel. The position of the "first" holder and of the former horn of the machine is indicated at X in Fig. 10. In Figs. 12 and 13, the same essential features will be found in a machine, having a flat, circular heating, soldering and sweating table; Y, being the former horn at the side of the table. I reserve the right to elaborate upon and claim such modifications in subsidiary applications for patents.

Having thus described my invention, I claim as new and desire to secure by Letters Patent:

1. In a can making machine, a former horn and take-off mechanism, in combination with a heated body, adjacent thereto, a vertically disposed multiple can body carrier, to receive can bodies from said horn, said carrier being arranged to revolve in a vertical plane, and means for moving said carrier about said body, substantially as described.

2. In a can making machine, a former horn, in combination with a transversely moving vertically disposed multiple can body carrier, said carrier being arranged to revolve in a vertical plane, means for delivering can bodies from said former horn to said carrier successively, a heated body, over which said carrier operates and a soldering mechanism associated with said heated body, substantially as described.

3. In a can making machine, a former horn, and a take-off mechanism, in combination with a heated body, adjacent thereto, a vertically disposed multiple can body carrier to receive successive can bodies from said horn, said carrier being arranged to revolve in a vertical plane, means for rotating said carrier about said heated body and a solder-applying mechanism, substantially as described.

4. In a can making machine, a can body forming mechanism, having a former horn, in combination with a heated body, adjacent to said horn, a vertically disposed multiple can body carrier, transversely movable with relation to said horn, for carrying can bodies into and out of contact with said heated body, said carrier being arranged to revolve in a vertical plane, means for removing successive can bodies from the horn to said carrier and a soldering mechanism, substantially as described.

5. In a can making machine, a can body forming mechanism, having a former horn, in combination with a heated body, adjacent to said horn, a vertically disposed multiple can body carrier, transversely movable with relation to said horn, for carrying can bodies into and out of contact with said heated body, said carrier being arranged to revolve in a vertical plane, means for removing successive can bodies from the horn to said carrier, said heated body being provided with a groove to receive solder, and means for supplying solder thereto, substantially as described.

6. In a can making machine, a former horn and take-off mechanism, in combination with a heated body, adjacent thereto, a vertically disposed multiple can body carrier to receive the bodies from the horn and which is movable around said heated body, said carrier being arranged to revolve in a vertical plane, and means for soldering the seams of the can bodies while traversing said heated body, substantially as described.

7. In a can making machine, a former horn, in combination with a cylinder, heating means in said cylinder, and means for taking successive can bodies from said horn and carrying each around said cylinder with its body seam in contact with the surface of said cylinder, substantially as and for the purpose described.

8. In a can making machine, the combination of a can body former horn, with a can body conveyer revoluble in a vertical plane, and a seam heating body, said conveyer being adapted to move can bodies transversely upon the surface of said heated body to prepare the seams of the can bodies for soldering, substantially as described.

9. In a can making machine, the combination of a can body former, with a can body conveyer, a vertically disposed seam heating body, and said conveyer being adapted to move can bodies transversely upon the surface of said heated body, to prepare the seams of the can bodies for soldering, said carrier being arranged to revolve in a vertical plane and means for soldering the seams of said cans, after they are heated, substantially as described.

10. In a can making machine, the combination of a can body former, with a heated body, provided with a soldering appliance and having heating and sweating surfaces, a conveyer to receive successive can bodies from said former and hold the seams thereof, in contact with said body, said conveyer being adapted to move said cans transversely upon the heating surface of said heated body, across said soldering appliance, and transversely upon said sweating surface and a suitable seam wiper, substantially as described.

11. In a can making machine, a can body former, in combination with a vertically disposed rotary can body conveyer to which successive can bodies are delivered from said former said carrier being arranged to revolve in a vertical plane, a cylindrical heated body for heating the can bodies upon said conveyer, a soldering mechanism arranged in said heated body and means for operating said former, conveyer and mechanism, substantially as described.

12. In a can making machine, a can body former, in combination with a heated body, adjacent thereto, a soldering mechanism and mechanisms adapted to remove successive can bodies from said former, and move said bodies upon the surface of said heated body, in a direction transverse to the axes of the several can bodies with the body seams in continuous contact with said surface during the first part of the movements of said bodies, substantially as described.

13. In a can making machine, a can body former, in combination with a cylindrical heated body, adjacent to said former, means for discharging successive can bodies from said former and upon said body, the several parts being so disposed that the seam of each can will be in continuous contact with the surface of said heated body, and means for moving the can bodies upon said surface in a direction transverse to their axes, substantially as and for the purpose specified.

14. In a can making machine, a can body former, in combination with a heated body, adjacent to said former, means for discharging successive can bodies from said former and upon said body, the several parts being so disposed that the seam of each can will contact with the surface of said heated body, means for moving the can bodies upon said surface in direction transverse to their axes, said heated body having a solder groove and means for filling said groove with solder at the moment of the arrival of a can body seam thereabove, substantially as described.

15. In a can making machine, a can body former, in combination with a rotary multiple carrier revoluble about an axis that is parallel with that of said former and a heated body containing a solder holder, across which successive can bodies are carried by said carrier, substantially as described.

16. In a can making machine, a can body former in combination with a cylindrical heated body and means for applying molten solder to the seam of said can, and a movable conveyer revoluble in transverse operative relation to said former, for carrying successive can bodies over said heated body and said soldering appliance with their seams in continuous contact with said heating body, substantially as described.

17. In a can making machine, a can body former, in combination with a heated body, disposed transversely with respect to said former and having a solder groove that is parallel with said former, and means for conveying can bodies into and out of contact with, and across said heated body and groove, substantially as described.

18. In a can making machine, a can body former, in combination with a heated seam heating soldering and sweating body and a conveyer for carrying can bodies partially around said body in a path substantially transverse to the axis of the can, with their seams in contact therewith, substantially as described.

19. In a can making machine, a can body former in combination with a heating and sweating body, containing a soldering groove that is parallel with the axis of said former, and a conveyer, adapted to hold a plurality of cans with their body seams parallel with said groove and move the cans transversely, substantially as described.

20. In a can making machine, a can body former, in combination with an intermittent can body carrier, provided with a plurality of can body holders, a heated body, means for driving said carrier, and means for rotating each said holder with relation to said heated body at certain times, substantially as described.

21. In a can making machine, a heated body, in combination with a multiple can body carrier, adapted to rotate about said heated body, and to hold the seams of a plurality of can bodies in contact with said heated body, and means for soldering the seams of said can bodies, substantially as described.

22. In a can making machine, a heated body, in combination with a rotary, multiple can body carrier, adapted to receive cans successively and hold the seams thereof against said heated body during a portion of the rotary movement of the carrier about said body, and means in said body for applying solder to the heated seams of successive cans, substantially as described.

23. In a can making machine, a heated body, in combination with a rotary multiple can carrier, to receive cans successively, and hold the seams thereof against said body, a soldering appliance provided in the top of said body, and a suitable seam-wiping device, substantially as described.

24. In a can making machine, a multiple can body carrier, in combination with a heated body, means for rotating the individual can holders or carriers about said body, in a direction transverse to the axes of said holders, means for rotating said holders upon their own axes and seam soldering and wiping mechanism, substantially as described.

25. In a can making machine, a heated body, and means for delivering seamed can bodies thereto, in combination with a can body conveyer, adapted to move can bodies transversely on said heated body and hold their seams in contact therewith, a longitudinal groove in said heating body, and means for filling said groove with molten solder, substantially as described.

26. In a can making machine, a cylindrical heated body, and means for delivering seamed can bodies transversely thereon, a conveyer for moving said can bodies transversely on the heated body, and soldering and wiping devices arranged in the path of said conveyer, substantially as described.

27. In a can making machine, a cylindrical heated body and means for holding can bodies transversely thereon, with their body seams in contact with the curved periphery of said body, in combination with means for applying molten solder to the end of the seam of each can while upon said body, and causing the molten solder to flood said body seam, substantially as described.

28. In a can making machine, a can body former, in combination with a heated body, adjacent thereto, means for relatively raising and lowering said former and body, a soldering device provided upon said body for soldering the can body seams and a multiple can holder, adapted to rotate about said body, substantially as described.

29. In a can making machine, a can body former, including a former horn, in combination with an eccentrically located heated body, equipped with a soldering device, and a rotary, multiple can holder, adapted to receive can bodies from said horn and carry the same partially around said heated body, substantially as described.

30. In a can making machine, a can body former, including a former horn, in combination with a heated body, a soldering device in the upper part of said body, a seam fluxing device, a conveyer revoluble about said body, and means for adjusting said body, said soldering and said fluxing devices, and said conveyer, laterally with relation to said horn, substantially as described.

31. In a can making machine, a former, adapted to form can bodies, with their seams uppermost, in combination with a heated body arranged above said former, a rotary conveyer to receive can bodies beneath said heated body, and a soldering device provided in the upper part of said heated body, substantially as described.

32. In a can making machine, a can body former, provided with a horn, having a false part, a fluxing device arranged above said false part, a relatively elevated soldering mechanism and a conveyer adapted to receive fluxed can bodies from the can forming horns and elevate the same to said soldering mechanism, substantially as described.

33. In a can making machine, a can body former and a seam fluxing device, in combination with a multiple can body conveyer arranged for rotation in a plane transverse with the axis of said former, and a heating, soldering and sweating body, arranged within said conveyer, substantially as described.

34. In a can making machine, a heating, soldering and sweating body, provided with a solder receiving recess and a solder pot, in combination with means for heating said body, a conveyer for rotating cans about said body, and mechanism for periodically dipping solder from said pot into said groove, substantially as described.

35. In a can making machine, a cast metal body containing an internal solder pot, and provided with a solder recess or groove, in combination with an intermittent rotary multiple can holder for contacting can bodies with said metal body and delivering the same to the solder groove therein, and means for periodically flooding said groove with molten solder from said pot, substantially as described.

36. In a can making machine, a heating, soldering and sweating cylinder or drum, in combination with planetary means for intermittently feeding can bodies over said body, and holding their seams in contact therewith while moving thereon a solder pot and a solder elevating dipper for intermittently delivering solder to the seams of can bodies, substantially as described.

37. In a can making machine, a cylindrical cast metal body, containing a solder groove, or recess, a solder pot and heating means, mechanism for periodically flooding said groove or recess with solder from said pot, and a rotary multiple can body carrier which carries a can body around said body with the body seam over the solder groove, substantially as described.

38. In a can making machine a heated body and solder pot, in combination with a dipper, arranged in said pot and having a ported swivel or pivot thereon, and means for operating said dipper, substantially as described.

39. In a can making machine, a heated body, having a solder groove, and a solder pot, in combination with a solder dipper, having a ported swivel on said body, and means for periodically operating said dipper, substantially as described.

40. In a can making machine, a heated drum containing a solder pot and a solder groove in its upper part, solder dipping mechanism for elevating solder to said groove, said drum having an overflow or return duct, and an intermittent multiple can body carrier, substantially as described.

41. In a can making machine, a can body former, in combination with a heating and sweating drum, seam soldering means at the top of said drum, an intermittent multiple can body carrier for rotation about said drum, and means for placing can bodies upon said carrier from said former, substantially as described.

42. In a can making machine, a can body former, including a former horn, in combination with a heating and sweating drum, a multiple can holder for rotation about said drum, means for placing can bodies from said horn upon said holder, with their seams in contact with said drum, means for fluxing said seams before they are placed in contact with said drum, mechanism for removing can bodies from said holder, and means provided on said drum for soldering the can seams prior to removal therefrom, substantially as described.

43. In a can making machine, a heated body, having a solder groove in its top, and means for periodically flooding said groove, in combination with an intermittent can body holder for holding can seams in contact with said body and presenting them at said groove, means for rotating each can body, after it leaves said groove, and a rotary reciprocating wiper, substantially as described.

44. In a can making machine, a heating, soldering and sweating drum, in combination with a can carrier provided with a plurality of holders, and means for rotating each of said holders to remove the seam of a can body thereon from contact from said drum, substantially as described.

45. In a can making machine, an intermittently rotated can body carrier, in combination with a rotary reciprocating seam wiper, and discharge or ejecting means, adapted to reciprocate with said wiper while said carrier is stationary, substantially as described.

46. In a can making machine, a former horn, in combination with a rotary vertically disposed can body carrier, having a plurality of can holders, presented one at a time in line with said horn, means for delivering successive can bodies from said horn to said holder, suitable soldering mechanism, and discharge means for stripping the soldered can bodies from said holders, substantially as described.

47. In a can making machine, a can body former, and heating, soldering and sweating mechanism, in combination with a vertically disposed rotary disk or wheel, said carrier being arranged to revolve in a vertical plane, a plurality of adjustable can holders thereon, a holder loading mechanism and a holder stripping mechanism, substantially as described.

48. In a can making machine, a single can body former, in combination with a heating soldering and sweating drum, containing two solder grooves, a solder pot and over-flow ducts, solder elevating means, a rotary can body conveyer, having an uneven number of can holders, said carrier being arranged to revolve in a vertical plane, and suitable holder, loader and stripping mechanisms, substantially as described.

49. In a can making machine, a can body former, in combination with a cylindrical heating, soldering, and sweating body, and a conveyer for carrying can bodies partially around said body with their seams in contact with the surface thereof, substantially as described.

50. In a can making machine, a heating, soldering and sweating body, in combination with a multiple can body carrier adapted to carry can bodies around said heating, soldering and sweating body and hold their seams in contact therewith; a solder pot; and a solder-elevating dipper for intermittently delivering solder to the seams of the can bodies, substantially as described.

51. In a can making machine, a can seam fluxing device comprising a can body holder, a flux receptacle, a pair of pulleys, one of which dips into said receptacle, and a belt of porous material running upon said pulleys and arranged to wipe the can body seams, substantially as described.

In testimony whereof, I have hereunto set my hand this 26th day of May, 1904, at Chicago, Illinois, in the presence of two witnesses.

VICTOR ODQUIST.

Witnesses:
C. G. HAWLEY,
JOHN R. LEFEVRE.